(12) United States Patent
Senior

(10) Patent No.: US 9,009,044 B1
(45) Date of Patent: Apr. 14, 2015

(54) MULTIPLE SUBSPACE DISCRIMINATIVE FEATURE TRAINING

(71) Applicant: Google Inc., Mountain View, CA (US)

(72) Inventor: Andrew William Senior, New York City, NY (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 13/762,294

(22) Filed: Feb. 7, 2013

Related U.S. Application Data

(60) Provisional application No. 61/670,102, filed on Jul. 10, 2012.

(51) Int. Cl.
  G10L 15/00   (2013.01)
  G10L 21/00   (2013.01)

(52) U.S. Cl.
  CPC ..................... *G10L 21/00* (2013.01)

(58) Field of Classification Search
  USPC ......... 704/238, 249, 251, 255, 270, 235, 257, 704/275, 256, 250, 244, 254, 231
  See application file for complete search history.

(56) References Cited

U.S. PATENT DOCUMENTS

| | | | |
|---|---|---|---|
| 8,275,619 B2 * | 9/2012 | Herbig et al. | 704/251 |
| 2009/0248394 A1 | 10/2009 | Sarikaya et al. | |
| 2011/0144991 A1 | 6/2011 | Fousek et al. | |
| 2014/0129224 A1 * | 5/2014 | Chien | 704/249 |

FOREIGN PATENT DOCUMENTS

WO    2011/071560    6/2011

OTHER PUBLICATIONS

Droppo, Jasha et al., "Maximum Mutual Information SPLICE Transform for Seen and Unseen Conditions," Interspeech, Sep. 4-8, 2005, pp. 989-992, vol. 17, Lisbon, Portugal.

Ellis, Daniel P.W. et al., "Tandem Acoustic Modeling in Large-Vocabulary Recognition," 2001 IEEE International Conference on Acoustics, Speech, and Signal Processing, 2001, pp. 517-520, vol. 1.

Geirhofer, Stefan, "Feature Reduction with Linear Discriminant Analysis and its Performance on Phoneme Recognition," Department of Electrical and Computer Engineering. University of Illinois, May 8, 2004, pp. 1-45.

Gutierrez-Osuna, Ricardo, "L10: Linear discriminants analysis," Lecture Notes from Pattern Analysis Course CSCE 666, pp. 1-15.

(Continued)

*Primary Examiner* — Charlotte M Baker
(74) *Attorney, Agent, or Firm* — McDonnell Boehnen Hulbert & Berghoff LLP

(57) ABSTRACT

Methods and apparatus related to speech recognition performed by a speech recognition device are disclosed. The speech recognition device can receive a plurality of samples corresponding to an utterance and generate a feature vector z from the plurality of samples. The speech recognition device can select a first frame $y_0$ from the feature vector z, and can generate a second frame $y_1$, where $y_0$ and $y_1$ differ. The speech recognition device can generate a modified frame x' based on the first frame $y_0$ and the second frame $y_1$ and then recognize speech related to the utterance based on the modified frame x'. The recognized speech can be output by the speech recognition device.

19 Claims, 6 Drawing Sheets

(56) References Cited

OTHER PUBLICATIONS

Heigold, Georg et al., "Modified MMI/MPE: A Direct Evaluation of the Margin in Speech Recognition." In Proceedings of the 25th international Conference on Machine Learning, 2008, pp. 384-391, ACM, New York, NY.

Hermansky, Hynek. "Perceptual linear predictive (PLP) analysis of speech," The Journal of the Acoustical Society of America, Apr. 1990, pp. 1738-1752, vol. 87, No. 4.

Hermansky, Hynek et al., "RASTA-PLP Speech Analysis," ICSI Technical Report TR-91-069, Dec. 1991, pp. 1-8.

Huang, Jing et al., "Discriminatively Trained Features Using fMPE for Multi-Stream Audio-Visual Speech Recognition",Interspeech, Sep. 4-8, 2005, pp. 777-780, vol. 17, Lisbon, Portugal.

McNeill, Bill, "Maximum Mutual Information Criterion Tutorial," Apr. 13, 2005, pp. 1-2.

Povey, Daniel et al., "FMPE: Discriminatively Trained Features for Speech Recognition", 2005 IEEE International Conference on Acoustics, Speech, and Signal Processing, 2005, pp. 961-964, vol. 1.

Rabiner, Lawrence R. "A Tutorial on Hidden Markov Models and Selected Applications in Speech Recognition." Proceedings of the IEEE, 1989, pp. 257-286, vol. 77, No. 2.

Rabiner, Lawrence R. et al., "Introduction to Digital Speech Processing," Foundations and Trends in Signal Processing, 2007, pp. 1-194, vol. 1, Nos. 1-2.

Reynolds, Douglas, "Gaussian Mixture Models," Encyclopedia of Biometric Recognition, 2008, pp. 12-17.

Rosell, Magnus. "An Introduction to Front-End Processing and Acoustic Features for Automatic Speech Recognition," Lecture Notes, 2006,pp. 1-10, School of Computer Science and CommunicationKTH, Stockholm, Sweden.

Wikimedia Foundation, "Linear discriminant anaylsis," http://en.wikipedia.org/wiki/Linear_discriminant_anaylsis, May 7, 2012, pp. 1-3.

Zhang, Bing et al., "Long Span Features and Minimum Phoneme Error Heteroscedastic Linear Discriminant Analysis", Proceedings of DARPA EARS RT-04 Workshop, Sep. 2004, pp. 1-6, vol. 15, Palisades, NY.

Zhang, Bing et al., "Recent Progress on the Discriminative Region-Dependent Transform for Speech Feature Extraction", Proceedings of International Conference on Spoken Language Processing (INTERSPEECH), 2006, pp. 1573-1576, Pittsburgh, PA.

\* cited by examiner

FIGURE 1 -- Prior Art

MULTIPLE SUBSPACE DISCRIMINATIVE FEATURE TRAINING

CROSS REFERENCE TO RELATED APPLICATIONS

This application claims priority to U.S. Provisional Pat. App. No. 61/670,102, entitled "Multiple Subspace Discriminative Feature Training", filed on July 10, 2012, which is fully incorporated by reference herein for all purposes.

BACKGROUND

Unless otherwise indicated herein, the materials described in this section are not prior art to the claims in this application and are not admitted to be prior art by inclusion in this section.

Computerized speech recognition can be broken down into a series of procedures. One procedure is to convert a stream of "acoustic features", or sampled and filtered speech data, to a stream of phonemes, which are then recognized as words.

Each acoustic feature can represent one or more samples of speech. For example, a fixed duration of speech can be sampled at fixed intervals of time; e.g. every 10-30 milliseconds. The sample can be transformed into a set of mel-frequency centered cepstral coefficients (MFCC) using well-known techniques. The set of MFCC coefficients corresponding to one sample of speech can be considered to be one acoustic feature.

Typically, a group of acoustic features are concatenated into a vector. For example, one sample of speech can be transformed into a set of MF MFCCs, where MF could be in the range of 10 to 15. A collection of NF acoustic vectors can be combined to form a feature vector z with MF*NF entries. A "frame" or subset of acoustic features x can be generated using a linear combination of the features in the feature vector z. For example, if MF=13, and NF=9, then z is a vector with 117 entries and each entry in the frame $y_0$ can be selected from linear combinations of the features in feature vector z, perhaps using Linear Discriminant Analysis (LDA). in a typical example, the frame $y_0$ has 39 entries representing linear combinations of the 117 entries in z.

FIG. 1 is a block diagram of a prior art speech recognition device 100. FIG. 1 shows speech recognition device 100 receiving sample utterance 110, which is processed by digital signal processor (DSP) 120 of speech recognition device 100 into a set of MFCCs 130. In some contexts, each coefficient of MFCCs 130 can be termed a "feature"; e.g., FIG. 1 shows MFCCs 130 as a set of 13 features.

Speech recognition device 100 can concatenate two or more sets of MFCCs to generate feature vector z 140. FIG. 1 shows that NF=9 sets of MFCCs $z_0$ 141, $z_1$ 142 ... $z_{NF-1}$ 149 are concatenated to form feature vector z 140 with a total of 117 features. Then, speech recognition device 100 can form frame $y_0$ 152 with 39 features using LDA technique 150 to select certain features (shown in black) from feature vector z 140.

Experimentation has indicated that "displacing" frame $y_0$ 152 in the feature space to generate a displaced vector can lead to better performance in recognizing utterance 110. Current techniques model this displacement, shown in FIG. 1 as displacement 154, as a matrix-vector product between a displacement matrix $M_0$ and a vector $h_0$ that is based on frame $y_0$ 152; i.e., $h_0 = \phi_h(y_0)$. Typically, $\phi_h(y_0)$ is a radial basis function operating on frame $y_0$ 152. A radial basis function operating on a vector $y_0$ is a function whose value depends on $y_0$'s distance, such as the Mahalanobis distance, from a designated center point c.

Displaced frame x' 156 can be written as:

$$x' = y_0 + M_0 h_0 = M_0 \phi_h(y_0) \quad (2)$$

The matrix $M_0$ can be learned on training data using a procedure, such as taught in Povey, Kingsbury, Mangu, Saon, Soltau and Zweig. Speech recognition device 100 can then provide displaced frame x' 156 to speech recognizer (SR) 160. Then, speech recognizer 160 can take displaced frame x' 156 as an input and, utilizing well-known speech recognition techniques, generate recognized speech (RS) 170 as a corresponding output.

SUMMARY

In one aspect of the disclosure of the application, a speech recognition device receives a plurality of samples corresponding to an utterance. The speech recognition device generates a feature vector z from the plurality of samples. The speech recognition device selects a first frame $y_0$ from the feature vector z. The speech recognition device generates a second frame y, where $y_0$ and $y_1$ differ. The speech recognition device generates a modified frame x' based on a matrix comprising values chosen based on measure of speech recognizer performance, the first frame $y_0$, and the second frame $y_1$. The speech recognition device recognizes speech related to the utterance based on the modified frame x'. The speech recognition device outputs the recognized speech.

In another aspect of the disclosure of the application, an article of manufacture is provided. The article of manufacture includes data storage storing computer-readable program instructions. The computer-readable program instructions are configured to, upon execution by the processor, cause the computing device to perform functions. The functions include: (i) receiving a plurality of samples corresponding to an utterance, (ii) generating a feature vector z from the plurality of samples, (iii) selecting a first frame $y_0$ from the feature vector z, (iv) generating a second frame $y_1$, where $y_0$ and $y_1$ differ, (v) generating a modified frame x' based on a matrix comprising values chosen based on measure of speech recognizer performance, the first frame $y_0$, and the second frame $y_1$, (vi) recognizing speech related to the utterance based on the modified frame x', and (vii) outputting the recognized speech.

In yet another aspect of the disclosure of the application, a computing device is provided. The computing device includes a processor and data storage. The data storage stores computer-readable program instructions, where the computer-readable program instructions are configured to, upon execution by the processor, cause the computing device to perform functions. The functions include: (i) receiving a plurality of samples corresponding to an utterance, (ii) generating a feature vector z from the plurality of samples, (iii) selecting a first frame $y_0$ from the feature vector z, (iv) generating a second frame $y_1$, where $y_0$ and $y_1$ differ, (v) generating a modified frame x' based on a matrix comprising values chosen based on measure of speech recognizer performance, the first frame $y_0$, and the second frame $y_1$, (vi) recognizing speech related to the utterance based on the modified frame x', and (vii) outputting the recognized speech.

DETAILED DESCRIPTION

Overview

In the prior art speech recognition device 100, most of the data in feature vector z is discarded—specifically, 78 out of 117 dimensions were projected out, and their information lost, in generating frame $y_0$ 152. However, the discarded features from feature vector z 140 can provide additional information to aid speech recognizer 160.

One technique to use discarded features from feature vector z is to select a second, and perhaps additional frames, of information from feature vector z 140. By selecting a second frame $y_1$ of 39 features from feature vector z 140, then 78 out of the 117 features in feature vector z 140 are used, and only 39 features are discarded.

Once the second frame $y_1$ is selected, it can be combined via one or more modification functions to frame x 152 to generate a modified frame x'. The modified frame x' can incorporate some of the information from the second frame $y_1$, as well as information from the first frame $y_0$. The additional information from frame $y_1$ can lead to better performance by speech recognize 160.

Example Operation

Figure 1:
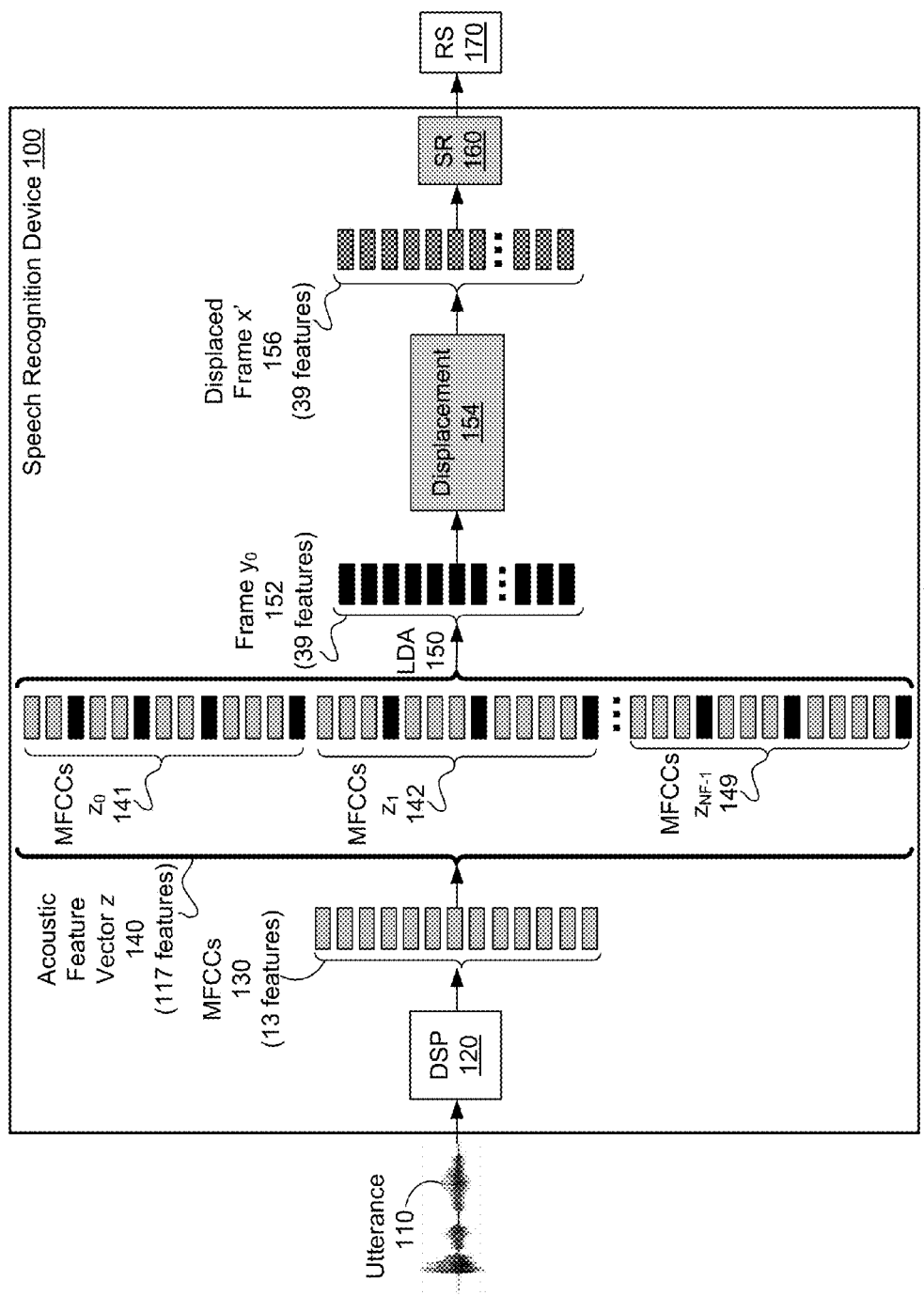
FIG. 1 is a block diagram of a prior art speech recognition device.
Figure 2:
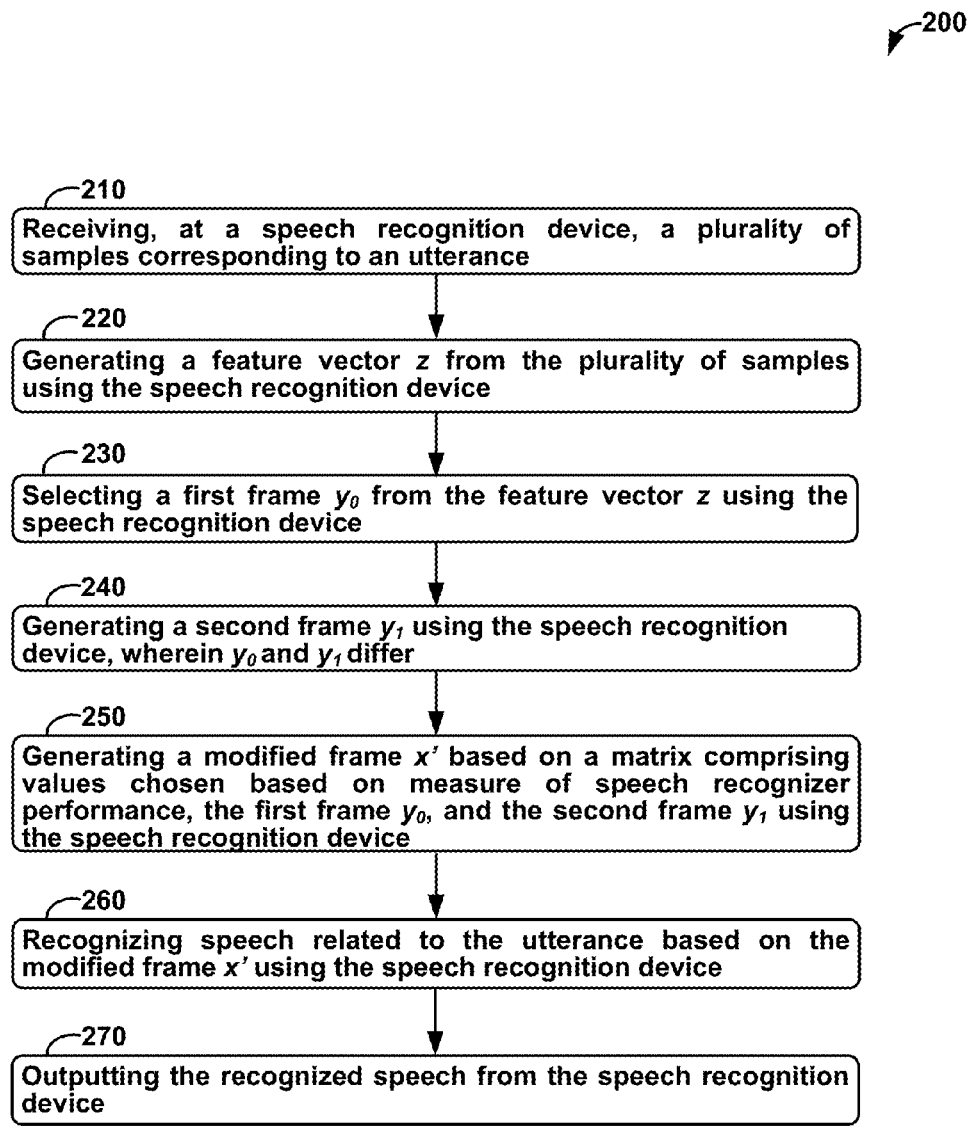
FIG. 2 is a flow chart of a method, in accordance with an example embodiment.

Returning to the Figures, FIG. 2 is a flow chart of an example method 200 in accordance with an example embodiment. At block 210, a speech recognition device can receive a plurality of samples corresponding to an utterance. At block 220, the speech recognition device can generate a feature vector z from the plurality of samples.

At block 230, the speech recognition device can select a first frame $y_0$ from the feature vector z. In some embodiments, selecting the first frame $y_0$ from the feature vector z can include setting the first frame $y_0$ to a first projection of the feature vector z.

At block 240, the speech recognition device can generate a second frame $y_1$, where $y_0$ and $y_1$ differ. In some embodiments, generating the second frame $y_1$ can include projecting features for the second frame $y_1$ from the feature vector z, where the first frame $y_0$ and the second frame $y_1$ are each selected using linear discriminant analysis (LDA).

In particular embodiments, the first frame $y_0$ and the second frame $y_1$ can each have a number NF of features, NF>0. The first frame $y_0$ can include NF entries of a linear projection of the feature vector z with each of the NF entries in the first frame $y_0$ feature-selection value that is less than a threshold $T_{y0}$. The second frame $y_1$ can include NF entries of the feature vector z, each of the NF entries in the second frame $y_1$ having a feature-selection value that is greater than the threshold $T_{y0}$ and less than a threshold $T_{y1}$.

In other embodiments, the second frame $y_1$ can have a number NF of features, NF>0, including a feature of the NF features based on pitch. In still other embodiments, the second frame y can have a number NF of features, NF>0, including a feature of the NF features based on prosody. In even other embodiments, the second frame $y_1$ can have a number NF of features, NF>0, including a feature of the NF features selected based on a Perceptive Linear Prediction (PLP) methodology, a RelAtive SpecTraAl (RASTA) methodology, by MFCC, by pitch, by prosody, and/or by some other methodologies.

At block 250, the speech recognition device can generate a modified frame x' based on a matrix comprising values chosen based on measure of speech recognizer performance, the first frame $y_0$, and the second frame $y_1$. In some embodiments, generating the modified frame x' can include generating the modified frame x' utilizing a matrix $M_0$ and a matrix $M_1$. In particular embodiments, generating the modified frame x' can include generating the modified frame x' based on a sum of a product of the matrix $M_0$ and the first frame $y_0$ and a product of the matrix $M_1$ and the second frame $y_1$.

In other embodiments, generating the modified frame x' can include generating the modified frame x' based on a binary hash function. The binary hash function can be represented by a frame; e.g., $y_{HASH}$.

At block 260, the speech recognition device can recognize speech related to the utterance based on the modified frame x'. At block 270, the speech recognition device can output the recognized speech.

In some embodiments, method 200 can additionally include: (a) generating a third frame $y_2$, wherein $y_2$ differs from both the first frame $y_0$ and the second frame $y_1$ and (b) generating the modified frame x' based on the first frame $y_0$, the second frame $y_1$, and the third frame $y_2$. In general, method 200 can additionally include: (a) generating a $(n+1)^{st}$ frame $y_n$, n>1, wherein each of the frames $y_0, y_1, \ldots y_n$ differs, and (b) generating the modified frame x' based on the frames $y_0, y_1, \ldots y_n$.

Example Novel Speech Recognition Devices

Figure 3:
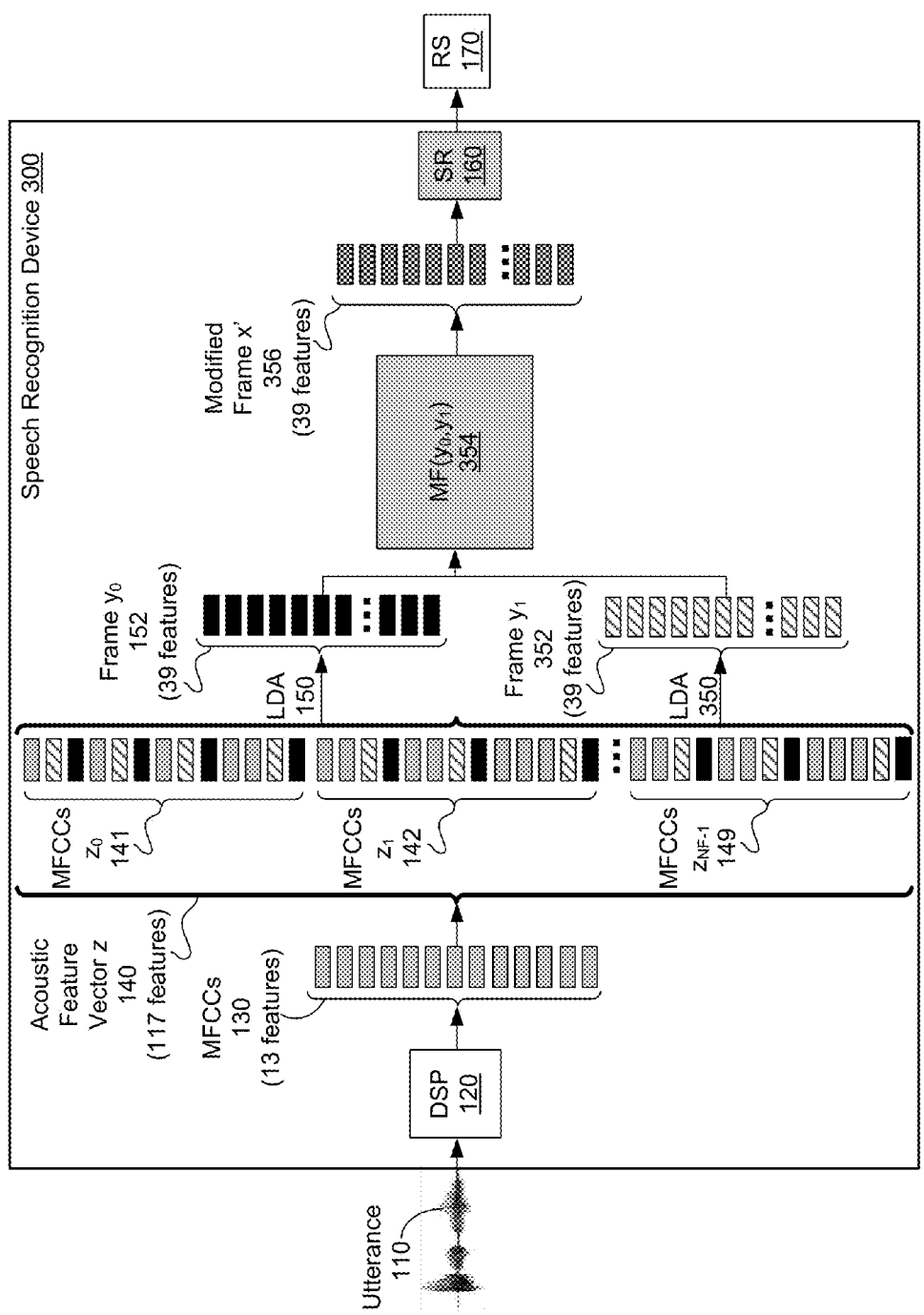
FIG. 3 is a block diagram of a speech recognition device, in accordance with an example embodiment.

FIG. 3 is a block diagram of speech recognition device 300, in accordance with an example embodiment. Speech recognition device 300 can receive utterance 110 and process utterance 110 using digital signal processor (DSP) 120 to generate a set of MFCCs 130. Speech recognition device 300 can concatenate nine sets of MFCCs 141, 142 ... 149, each set of MFCCs having NF=13 features, to generate feature vector z 140 with a total of 117 features. Speech recognition device 300 can form frame $y_0$ 152 with 39 features using LDA technique 150 to select the black features from feature vector z 140, as was performed by speech recognition device 100. In some embodiments not shown in the figures, features of frame $y_0$ 152 can be selected using one or more other techniques than LDA 150, such as but not limited to functions 450 and noise functions, both which are discussed below in more detail in the context of FIG. 4.

In contrast with speech recognition device 100, speech recognition device 300 can (a) use a second frame, shown in FIG. 3 as frame $y_1$ 352 and/or (b) use modification functions 354 to generate modified frame x' 356 from frame $y_0$ 152 and frame $y_1$ 352. FIG. 3 shows the modification functions as $MF(y_0, y_1)$ 354 in a grey box. In some embodiments, the modification functions can be displacement functions that have been extended or otherwise modified to take both frame $y_0$ 154 and frame $y_1$ 352 as inputs.

FIG. 3 shows LDA 350 is used to generate frame $y_1$ 352. Modification functions 354 can utilize multiple matrices to modify and/or displace frames $y_0$ 348 and frame $y_1$ 352 to generate modified frame x' 356. For example, a displacement matrix $M_1$ and radial basis function $\phi_h(y_1)$ can he selected for frame $y_1$ 352. In some embodiments, a displacement matrix M, e.g., $M=M_0$ or $M=M_1$, can be trained using a linear technique such as the matrix training technique (performed by the fMPE algorithm. Then, basis function vector $h_1$ can be calculated as $h_1=\phi_h(y_1)$. Equation (2) written above for generating modified frame x' 156 can be modified, as equation (3) below, for generating modified frame x' 356.

$$x'=y_0+M_0h_0+M_1h_1=y_0+M_0\phi_h(y_0)+M_1\phi_h(y_1) \quad (3)$$

in other embodiments, prior to learning, $M_0$ and $M_1$ can be concatenated, as well as concatenating $\phi_h(y_0)$ and $\phi_h(y_1)$. Then, the matrix training technique discussed above can be performed on the concatenation of matrices $M_0$ and $M_1$, which can also utilize the concatenation of $\phi_h(y_0)$ and $\phi_h(y_1)$. After performing matrix training, the trained concatenation of matrices $M_0$ and $M_1$ can be split to form trained matrix $M_0$ and trained matrix $M_1$.

In still other embodiments, $M_0$ can be learned separately from $M_1$, where $M_0$ remains unchanged while $M_1$ is being learned and vice versa. In particular of these embodiments, multiple training steps can be used; e.g., $M_0$ can be learned, $M_1$ can be learned, $M_0$ can be updated based on the learned $M_1$, $M_1$ can be updated based on the updated $M_0$ and so on. Other techniques for generating $M_0$ and/or $M_1$ are possible as well In even other embodiments, matrices $M_0, M_1, \ldots$ can be learned sequentially; e.g., learning $M_i$ while holding all of $M_j$ constant, $j\neq i$, with each of the $M_0, M_1, \ldots$ being initialized to zero. Alternatively, the $y_i$'s can be concatenated and a global matrix M equivalent to the concatenation of all the $M_i$'s can be learned in a single operation.

In embodiments not shown in the Figures, more than two frames can be selected to generate modified frame x' 356. Let $\{y_0, y_1, y_2, \ldots, y_n\}$ be the set of n+1 frames selected to generate x'. In this example where more than two frames are selected, n>1. Suitable displacement matrices $M_2, \ldots M_n$, and basis vectors $h_2, \ldots h_n$, can be selected for the additional frames where $h_2=\phi_h(y_2), \ldots h_n=\phi_h(y_n) \ldots \phi_h(\alpha_n)$. Then, equation (3) can be generalized to generate a modified frame x' using the set of n+1 frames as follows:

$$x' = y_0 + M_0h_0 + M_1h_1 + M_2h_2 + \ldots + M_nh_n$$
$$= y_0 + M_0\varphi_h(y_0) + M_1\varphi_h(y_1) + M_2\varphi_h(y_2) + \ldots + M_n\varphi_h(y_n) \quad (4)$$

Even more generally, multiple matrices and basis functions can be used for each frame such as shown in equation (5) below:

$$x'=y_0+M_{01}h_{01}+M_{02}h_{02}+\ldots+M_{0m}h_{0m}+M_{11}h_{11}+$$
$$M_{12}h_{12}+\ldots+M_{1m}h_{1m}+M_{21}h_{21}+M_{22}h_{22}+\ldots+$$
$$M_{2m}h_{2m}+\ldots+M_{n1}h_{n1}+M_{n2}h_{n2}+\ldots+M_{nm}h_{nm} \quad (5)$$

where m=number of matrices for each frame. In some embodiments, m can vary for each frame, i.e., m can be a function of the frame.

Other functions than the radial basis functions $\phi_h(y_i)$ can be used to generate modified frame x' 356 as well.

For example, let $b_1(\alpha) \ldots b_B(\alpha)$ be a set of B binary functions each operating on a vector y, where y has at least NF features. For example, $b_1(\alpha) \ldots b_B(\alpha)$ can be binary-valued hash functions. Example selections of $\alpha$ can be $y_0$, $y_1$, or a concatenation of vectors; e.g., $[y_0 \, y_1]$. If the hash function is integer valued, rather than binary valued, then a group of binary functions can be used to simulate the integer value function. For example, if $I(\alpha)$ is an integer-valued hash function with values from 1 to 10, $B_1(\alpha) \ldots B_{10}(\alpha)$ can be used, where $B_1(\alpha)=\{1$, when $I(\alpha)=1$, and 0 otherwise$\}$
$B_2(\alpha)=\{1$, when $I(\alpha)=2$, and 0 otherwise$\}$
. . .
$B_{10}(\alpha)=\{1$, when $I(\alpha)=10$, and 0 otherwise$\}$.

Then, equation (5) for the case of two frames $y_0$ and $y_1$ can be written to add he binary functions $b_1(\alpha) \ldots b_B(\alpha)$ as follows:

$$x'=x+M_1h_1+M_2h_2+\ldots+M_{nm}h_{nm}+M_1h_{y1}+M_2h_{y2}+\ldots+$$
$$M_{nm}h_{nm}+b_1(y)+\ldots+b_B(y) \quad (6)$$

Equation (3) can be modified to add the binary hash functions $b_1, \ldots b_B$ to form equation (7a):

$$x'=y_0+M_0h_0+M_1h_1+b_1(\alpha)+b_2(\alpha)+\ldots+b_B(\alpha) \quad (7a)$$

In other embodiments, the binary hash functions can replace some or all of the basis functions $\phi_h(y)$, as shown in example equation (7b) below where $h_1=\phi_h(y_1)$ has replaced by a sum of the binary hash functions $b_1, \ldots b_B$:

$$x'=y_0+M_0h_0+M_1[b_1(y_1)+b_2(y_1)+\ldots+b_B(y_1)]=y_0+$$
$$M_0\phi_h(y_0)+M_1,[\Sigma_{i=1 \, to \, B}b_i(y_1)] \quad (7b)$$

Additional combinations between use of binary hash functions, matrices $M_0$ and $M_1$, and basis functions $\phi_h(y_0)$ and $\phi_h(y_1)$ for both frames $y_0$ 152 and $y_1$ 352 are possible as well. Also, equation (6) can be modified perhaps by using equation (7b) as a model. In some embodiments, some or all of the $\phi_h$ functions can be generated randomly; e.g., random projections, randomly generated hashing function, and other uses of random values. Once the $\phi_h$ functions that have been generated randomly, then the $\phi_h$ functions can remain constant and the $y_0, y_1, \ldots$ values are themselves not randomized.

Figure 4:
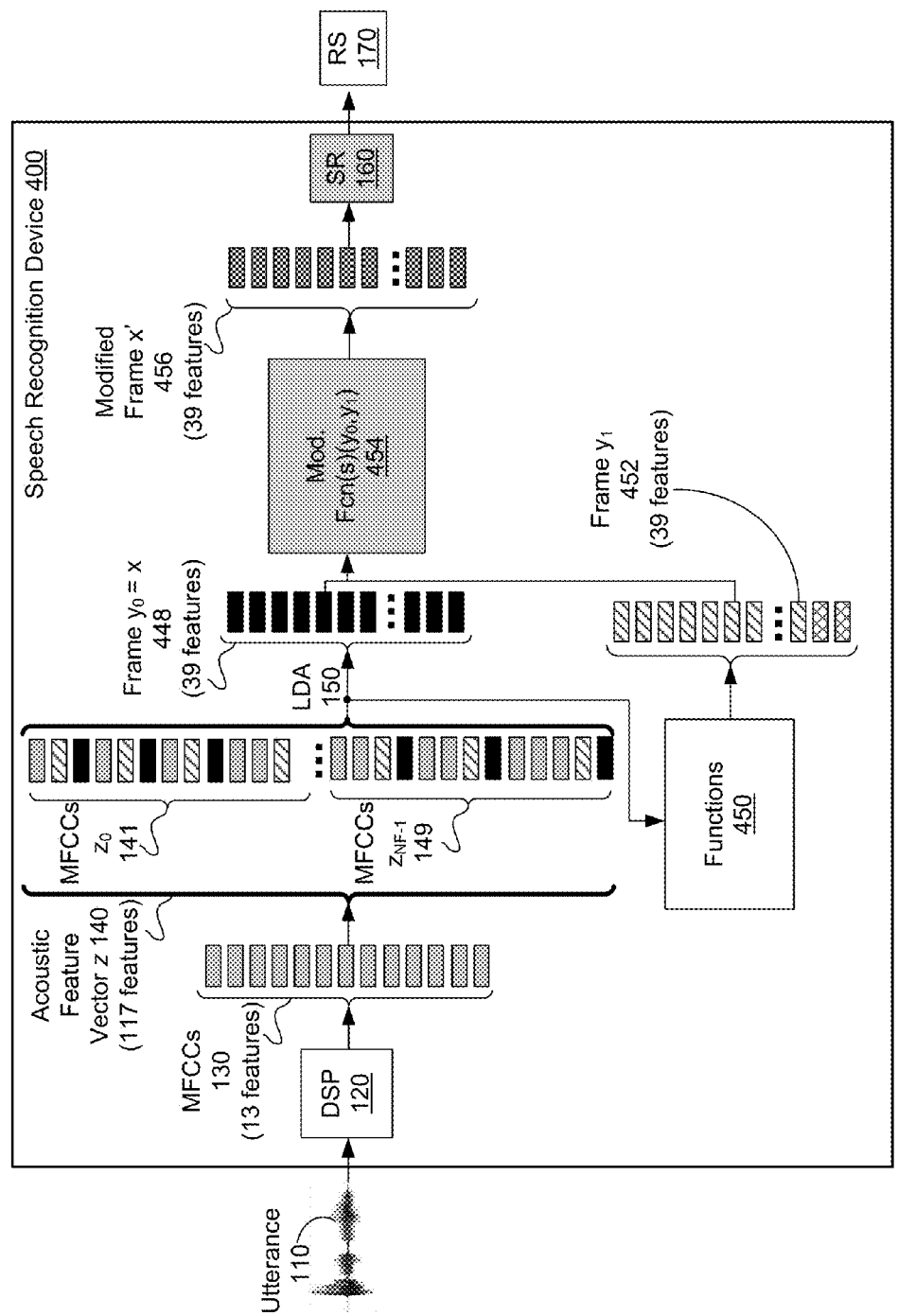
FIG. 4 is a block diagram of another speech recognition device, in accordance with an example embodiment.

FIG. 4 is a block diagram of speech recognition device 400, in accordance with an example embodiment. Speech recognition device 400 is related to speech recognition device 300 for example, in that frame $y_0$ 152 is selected in both speech recognition devices 300, 400. Unlike speech recognition device 300, speech recognition device 400 can utilize functions 450 to select feature(s) in frame y 452.

Functions 450 can include LDA 350, additional techniques, and/or additional sources to select values for frame $y_1$ 452. For example, frame $y_1$ 452 can be partially or completely selected from sources other than feature vector z 140; frame $y_1$ 452 can be made up of data representing pitch, prosody, and/or speech filtered via techniques other than MFCC such as RASTA or TANDEM, etc. Some other example techniques other than LDA that can be used as functions 450 can include Fisher's linear discriminant, a multi-class implementation of LDA, Monte Carlo methods, and/or other techniques. Additionally or instead, functions 450 can include the binary-valued hash functions $b_1(\alpha) \ldots b_B(\alpha)$ discussed above in the context of FIG. 3.

Experimental Results

The above-mentioned techniques have been applied to three language sets "cs_cz", "pl_pl", and "tr_tr" and a number of different speech recognition techniques have been applied to the language sets. Table 1 below summarizes the results:

TABLE 1

| | WER % | | | | | | |
|---|---|---|---|---|---|---|---|
| | Single Technique | | | | Two Techniques | | Dual |
| Language | ML | MMI | fMMI | Dual fMMI | MMI + fMMI | MMI + dual fMMI | fMMI + MMI |
| cs_cz | 51.8 | 49.2 | 49.9 | 49.3 | 48.7 | 48.2 | 48.4 |
| pl_pl | 56.0 | 50.5 | 52.9 | 53.1 | 50.0 | 50.4 | 50.1 |
| tr_tr | 66.4 | 56.7 | 59.9 | 59.7 | 56.3 | 56.1 | 56.2 |

For each language, the "ML" or maximum likelihood column provides the word-error rate percentage (WER %) values for recognition using the maximum likelihood technique. For example, a WER % of 51.8% was obtained for recognition of words in the "cs_cz" state using the maximum likelihood state. The remaining columns of Table 1 include results when one technique was used, including the "MMI" or maximum mutual information technique, "fMMI" or feature space MMI, "Dual fMMI" or the herein-described multi-feature fMMI technique, and results when one technique was followed with a second technique, such as "MMI +fMMI" where an MMI pass was followed by an fMMI pass, "MMI+ dual fMMI" where an MMI pass was followed by a dual fMMI pass, and "Dual fMMI+MMI" where an dual MMI pass was followed by an MMI pass, The best (lowest) WER % for each language is shown in bold above.

Table 1 indicates that two techniques work better than one for all languages, and for two of the three languages, using the Dual fMMI technique as one of the two techniques yields the best/lowest WER %.

Example Data Network

Figure 5:
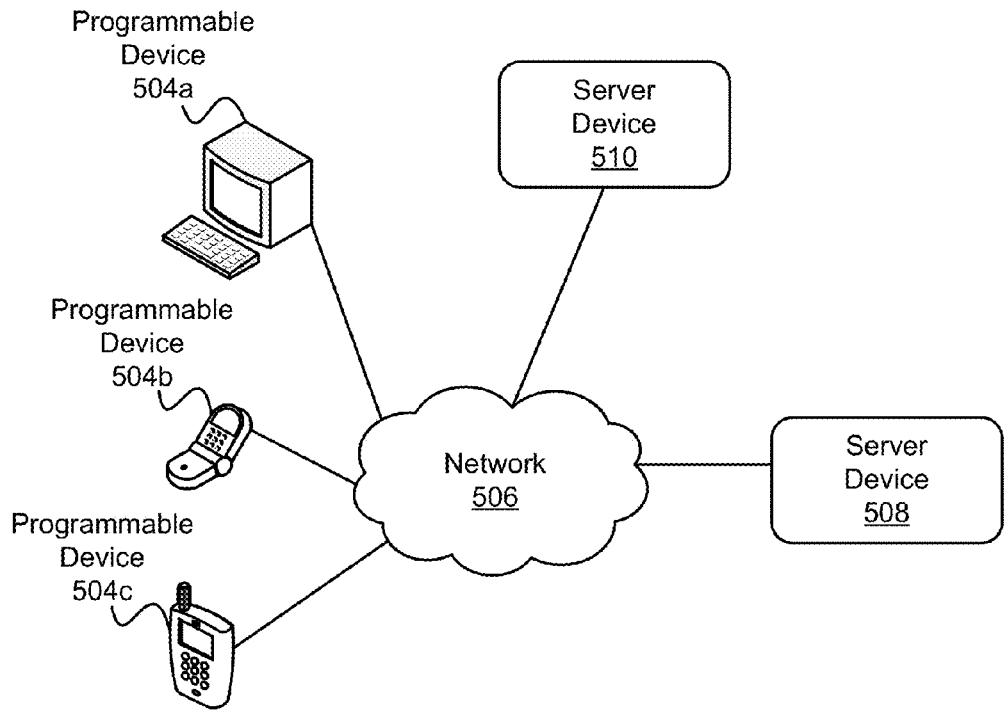
FIG. 5 depicts a distributed computing architecture, in accordance with an example embodiment.

FIG. 5 shows server devices 508, 510 configured to communicate, via network 506, with programmable devices 504a, 504b, and 504c. Network 506 may correspond to a LAN, a wide area network (WAN), a corporate intranet, the public Internet, or any other type of network configured to provide a communications path between networked computing devices. The network 506 may also correspond to a combination of one or more LANs, WANs, corporate intranets, and/or the public Internet.

Although FIG. 5 only shows three programmable devices, distributed application architectures may serve tens, hundreds, or thousands of programmable devices. Moreover, programmable devices 504a, 504b, and 504c (or any additional programmable devices) may be any sort of computing device, such as an ordinary laptop computer, desktop computer, network terminal, wireless communication device (e.g., a cell phone or smart phone), and so on. In some embodiments, programmable devices 504a, 504b, and 504c may be dedicated to the design and use of software applications. In other embodiments, programmable devices 504a, 504b, and 504c may be general purpose computers that are configured to perform a number of tasks and need not be dedicated to software development tools. In still other embodiments, programmable devices 504a, 504b, and/or 504c can be configured to perform some or all of the herein-described functionality of mobile device 202.

Server devices 508, 510 can be configured to perform one or more services, as requested by programmable devices 504a, 504b, and/or 504c. For example, server device 508 and/or 510 can provide content to programmable devices 504a-504c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 508 and/or 510 can provide programmable devices 504a-504c with access to software for database, search, computation, graphical, audio, video, World Wide Web/Internet utilization, and/or other functions. Many other examples of server devices are possible as well.

Computing Device Architecture

Figure 6A:
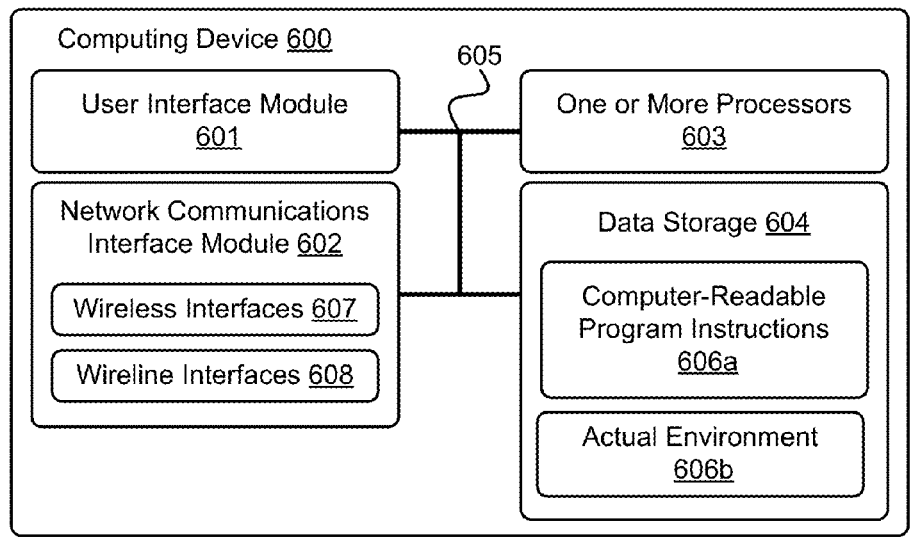
FIG. 6A is a block diagram of a computing device, in accordance with an example embodiment.

FIG. 6A is a block diagram of a computing device (e.g., system) in accordance with an example embodiment. In particular, computing device 600 shown in FIG. 6A can be configured to perform one or more functions of mobile device 202, server devices 508, 510, network 506, and/or one or more of programmable devices 504a, 504b, and 504c. Computing device 600 may include a user interface module 601, a network-communication interface module 602, one or more processors 603, and data storage 604, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a track ball, a joystick, a camera, a voice recognition module, and/or other similar devices. User interface module 601 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network, such as network 506 shown in FIG. 5. Wireless interfaces 607 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 603 can include one or more general purpose processors and/or one or more special purpose processors (e.g., digital signal processors, application specific integrated circuits, etc.). Processors 603 can be configured to execute computer-readable program instructions 606a that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606a, actual environment 606b, and perhaps additional data. Actual environment 606b can store at least some of the data used by one or more processes and/or threads of a software application. In some embodiments, data storage 604 can additionally include storage required to perform at least part of the herein-described methods and techniques and/or at least part of the functionality of the herein-described devices and networks.

Cloud-Based Servers

Figure 6B:
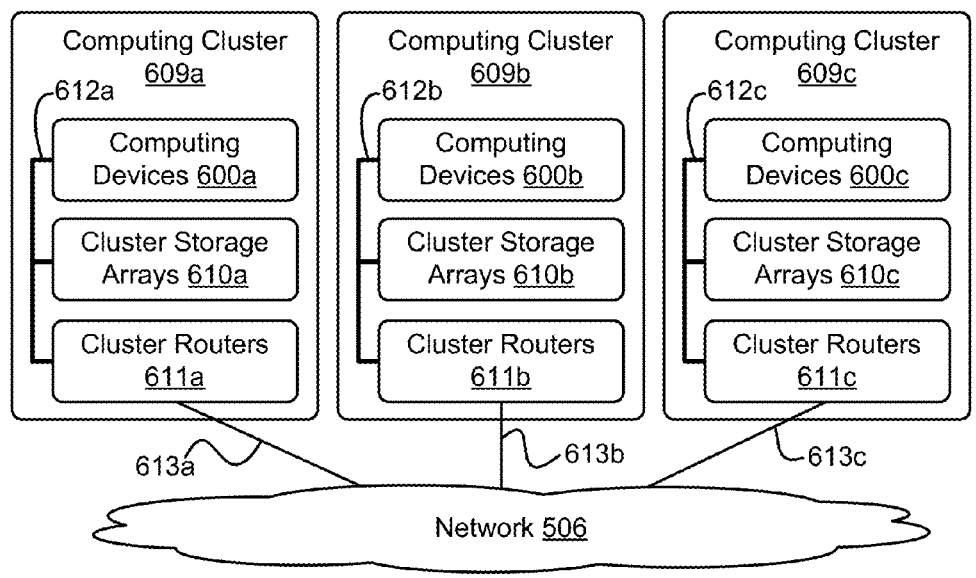
FIG. 6B depicts a cloud-based server system, in accordance with an example embodiment.

FIG. 6B depicts a network 506 of computing clusters 609a, 609b, 609c arranged as a cloud-based server system in accordance with an example embodiment. Server devices 508 and/or 510 can be cloud-based devices that store program logic and/or data of cloud-based applications and/or services. In some embodiments, server devices 508 and/or 510 can be a single computing device residing in a single computing center. In other embodiments, server device 508 and/or 510 can include multiple computing devices in a single computing center, or even multiple computing devices located in multiple computing centers located in diverse geographic locations. For example, FIG. 5 depicts each of server devices 508 and 510 residing in different physical locations.

In some embodiments, data and services at server devices 508 and/or 510 can be encoded as computer readable information stored in tangible computer readable media (or computer readable storage media) and accessible by programmable devices 504a, 504b, and 504c, and/or other computing devices. In some embodiments, data at server device 508 and/or 510 can be stored on a single disk drive or other tangible storage media, or can be implemented on multiple disk drives or other tangible storage media located at one or more diverse geographic locations.

FIG. 6B depicts a cloud-based server system in accordance with an example embodiment. In FIG. 6B, the functions of server device 508 and/or 510 can be distributed among three computing clusters 609a, 609b, and 608c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of the computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of electronic communications server 512. In one embodiment, the various functionalities of electronic communications server 512 can be distributed among one or more of computing devices 600a, 600b, and 600c. Computing devices 600b and 600c in computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with server devices 508 and/or 510 can be distributed across computing devices 600a, 600b, and 600c based at least in part on the processing requirements of server devices 508 and/or 510, the processing capabilities of computing devices 600a, 600b, and 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610a, 610b, and 610c of the computing clusters 609a, 609b, and 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 508 and/or 510 can be distributed across computing devices 600a, 600b, and 600c of computing clusters 609a, 609b, and 609c, various active portions and/or backup portions of these components can be distributed across cluster storage arrays 610a, 610b, and 610c. For example, some cluster storage arrays can be configured to store the data of server device 508, while other cluster storage arrays can store data of server device 510. Additionally, some cluster storage arrays can be configured to store backup versions of data stored in other cluster storage arrays.

The cluster routers 611a, 611b, and 611c in computing clusters 609a, 609b, and 609c can include networking equipment configured to provide internal and external communications for the computing clusters. For example, the cluster routers 611a in computing cluster 609a can include one or more internet switching and routing devices configured to provide (i) local area network communications between the computing devices 600a and the cluster storage arrays 601a via the local cluster network 612a, and (ii) wide area network communications between the computing cluster 609a and the computing clusters 609b and 609c via the wide area network connection 613a to network 506. Cluster routers 611b and 611c can include network equipment similar to the cluster routers 611a, and cluster routers 611b and 611c can perform similar networking functions for computing clusters 609b and 609b that cluster routers 611a perform for computing cluster 609a.

In some embodiments, the configuration of the cluster routers 611a, 611b, and 611c can be based at least in part on the data communication requirements of the computing devices and cluster storage arrays, the data communications capabilities of the network equipment in the cluster routers 611a, 611b, and 611c, the latency and throughput of local networks 612a, 612b, 612c, the latency, throughput, and cost of wide area network links 613a, 613b, and 613c, and/or other factors that can contribute to the cost, speed, fault-tolerance, resiliency, efficiency and/or other design goals of the moderation system architecture.

Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
receiving, by a speech recognition device, a plurality of samples corresponding to an utterance;
generating a feature vector z from the plurality of samples using the speech recognition device;
selecting a first frame $y_0$ from the feature vector z using the speech recognition device;
generating a second frame $y_1$ using the speech recognition device, wherein $y_0$ and $y_1$ differ;
generating a modified frame x' utilizing a matrix $M_0$, a matrix $M_1$, the first frame $y_0$, and the second frame $y_1$ using the speech recognition device;
recognizing speech related to the utterance based on the modified frame x' using the speech recognition device; and
outputting the recognized speech from the speech recognition device.

2. The method of claim 1, wherein generating a second frame $y_1$ comprises selecting features for the second frame $y_1$ from the feature vector z.

3. The method of claim 1, wherein the first frame $y_0$ and the second frame $y_1$ are each selected using linear discriminant analysis (LDA).

4. The method of claim 3, wherein the first frame $y_0$ and the second frame $y_1$ each have a number NF of features, NF>0, wherein the first frame $y_0$ comprises NF entries of the feature vector z, each of the NF entries in the first frame $y_0$ having a feature-selection value that is less than a threshold $T_x$, and wherein the second frame $y_1$ comprises NF entries of the feature vector z, each of the NF entries in the second frame $y_1$ having a feature-selection value that is greater than the threshold $T_x$ and less than a threshold $T_y$.

5. The method of claim 1, further comprising:
generating a third frame $y_2$, wherein $y_2$ differs from both the first frame $y_0$ and the second frame $y_1$; and
generating the modified frame x' based on the first frame $y_0$, the second frame $y_1$, and the third frame $y_2$.

6. The method of claim 1, wherein generating the modified frame x' comprises generating the modified frame x' based on a sum of a product of the matrix $M_0$ and the first frame $y_0$ and a product of the matrix $M_1$ and the second frame $y_1$.

7. The method of claim 1, wherein generating the modified frame x' comprises generating the modified frame x' based on a binary hash function.

8. The method of claim 1, wherein the second frame $y_1$ has a number NF of features, NF>0, and comprises a feature of the NF features based on pitch.

9. The method of claim 1, wherein the second frame $y_1$ has a number NF of features, NF>0, and comprises a feature of the NF features based on prosody.

10. The method of claim 1, wherein the second frame $y_1$ has a number NF of features, NF>0, and comprises a feature of the NF features based on a RelAtive SpecTraAl (RASTA) methodology.

11. An article of manufacture including a non-transitory computer-readable storage medium having computer-readable instructions encoded thereon that, upon execution, cause a processor to perform functions comprising:
   receiving a plurality of samples corresponding to an utterance;
   generating a feature vector z from the plurality of samples;
   selecting a first frame $y_0$ from the feature vector z;
   generating a second frame $y_1$, wherein $y_0$ and $y_1$ differ;
   generating a modified frame x' utilizing a matrix $M_0$, a matrix $M_1$, the first frame $y_0$, and the second frame $y_1$;
   recognizing speech related to the utterance based on the modified frame x'; and
   outputting the recognized speech.

12. The article of manufacture of claim 11, wherein the second frame $y_1$ has a number NF of features, NF>0, comprising a feature of the NF features based on pitch.

13. The article of manufacture of claim 11, wherein selecting the first frame $y_0$ from the feature vector z comprises setting the first frame $y_0$ to a first projection of the feature vector z.

14. The article of manufacture of claim 13, wherein generating the second frame $y_1$ comprises setting the second frame $y_1$ to a second projection of the feature vector z, wherein the second projection of the feature vector z does not equal the first projection, and wherein the first projection and the second projection are each projections based on linear discriminant analysis (LDA).

15. The article of manufacture of claim 11, wherein generating the modified frame x' comprises generating the modified frame x' based on a sum of a product of a matrix $M_0$ and the first frame $y_0$ and a product of the matrix $M_1$ and the second frame $y_1$.

16. A computing device, comprising:
   a processor; and
   a non-transitory computer-readable storage medium storing computer-readable program instructions, wherein the computer-readable program instructions are configured to, upon execution by the processor, cause the computing device to perform functions comprising:
      receiving a plurality of samples corresponding to an utterance,
      generating a feature vector z from the plurality of samples,
      selecting a first frame $y_0$ from the feature vector z,
      generating a second frame $y_1$, wherein $y_0$ and $y_1$ differ,
      generating a modified frame x' based on utilizing a matrix $M_0$, a matrix $M_1$, the first frame $y_0$, and the second frame $y_1$,
      recognizing speech related to the utterance based on the modified frame x', and
      outputting the recognized speech.

17. The computing device of claim 16, wherein the second frame $y_1$ has a number Nf of features, Nf>0, comprising a feature of the Nf features based on pitch.

18. The computing device of claim 16, wherein selecting the first frame $y_0$ from the feature vector z comprises setting the first frame $y_0$ to a first projection of the feature vector,
   wherein generating the second frame $y_1$ comprises setting second frame $y_1$ to a second projection of the feature vector z,
   wherein the second projection of the feature vector z does not equal the first projection, and
   wherein the first projection and the second projection are each projections based on linear discriminant analysis (LDA).

19. The computing device of claim 16, wherein generating the modified frame x' comprises generating the modified frame x' based on a sum of a product of a matrix $M_0$ and the first frame $y_0$ and a product of the matrix $M_1$ and the second frame $y_1$.

* * * * *